Patented Aug. 19, 1952

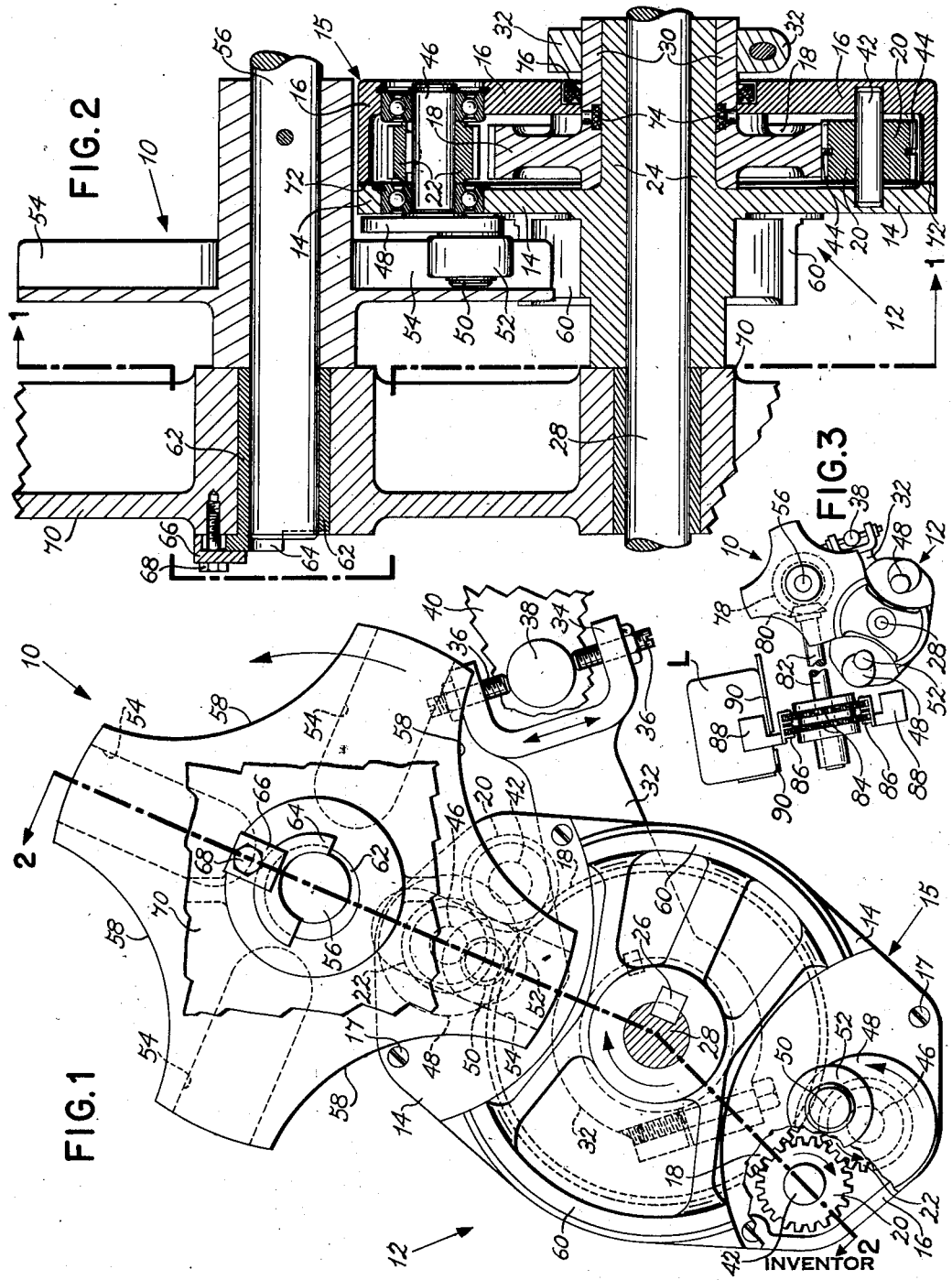

2,607,237

UNITED STATES PATENT OFFICE 2,607,237

INDEXING MECHANISM

Rollin Douglas Rumsey, Buffalo, N. Y., assignor to American Machine & Foundry Company, a corporation of New Jersey Application October 7, 1950, Serial No. 189,015

11 Claims. (Cl. 74—436)

This invention relates to an indexing mechanism, and more particularly to improvements in an indexing device suitable for intermittently and smoothly driving a conveyor at a high rate of speed, such as the infeed conveyor of a high speed bread wrapping machine.

In machines for wrapping articles, such as loaves of bread, and especially sliced loaves of bread, it has been found that when such machines are operated at high rates of speed, as for example fifty loaves per minute, occasionally because of the construction and operation of the intermittent driving mechanism employed, slices of sliced loaves of bread on the infeed conveyor are thrown out or become misaligned. This results in the delivery of imperfect loaves of sliced bread or improperly arranged loaves of bread to the wrapping station of the wrapping machine, and when they are delivered or conveyed into and through the machine, a "cripple" or unsatisfactory package results. Also in the operation of such intermittent driving mechanisms in introducing unsliced loaves of bread into a machine operating at, say, fifty loaves per minute, the whole loaf of bread occasionally becomes improperly positioned thereon and therefore such loaves are not delivered properly to the wrapping station. These situations therefore have made it necessary to slow down the operation of such machines, and accordingly the manufacturer experiences a loss in output and an increase in cost per unit wrapped.

The present invention constitutes a solution of this problem because it provides an intermittent driving device or Geneva mechanism which not only eliminates the difficulties above noted, but also makes possible a material increase in the number of articles which may be wrapped on a given machine, such as loaves of bread, sliced or unsliced. With a wrapping machine using the indexing mechanism constructed in accordance with this invention, eighty or more loaves of sliced bread per minute have been fed into the wrapping machine without dislodgement or misalignment of slices or improper positioning of unsliced loaves fed therein by the infeed conveyor. The resulting benefits to the manufacturing baker are obvious both as to satisfaction in product wrapped, and to increased output in number of units wrapped per unit of time, and because of the substantial freedom from damaged loaves or cripples, all resulting from the improved infeed mechanism and its novel intermittent drive or Geneva device.

While reference is made to the use of the improved mechanism constituting the invention in connection with wrapping machines, it is obvious that it can find uses in other fields where it is desired to have a smoothly operating, substantially wear-free, high-speed indexing mechanism or Geneva device.

In the improved intermittent drive or indexing mechanism constituting the invention, the peak acceleration forces and loads on the cam followers or driving pins are materially less than those of Geneva or equivalent driving devices heretofore known and used, thereby substantially eliminating shock and abrupt changes in speed. Also the driving parts of the improved Geneva mechanism constituting the invention are all enclosed within the Geneva actuating member or arm which forms a rotating grease-sealed housing. This construction permits the removal of the entire driving assembly, including all gears, cam followers and star wheel lock elements from the drive shaft without the loss of mesh or timing. These features contribute to longer life of the improved indexing mechanism due to substantial lessening of wear and tear on the operating parts which are enclosed within the housing, and also make possible easier servicing due to the elimination of the need for retiming. Provision is also made to prevent pumping of the grease in the housing.

The invention also takes into consideration the desirability of compensating for wear on the lock of the novel indexing mechanism by providing simple, easily adjustable means for adjusting the position of the star wheel relative to the driving housing or arm. It also includes an adjusting device, such as a lever or arm attached to the hub of the sun gear which is enclosed within the housing, by means of which the position of this gear may be changed in order to control the timing of the cam followers or driving pins relative to the slots in the star wheel.

It is therefore an object of the invention to provide an improved high-speed indexing or intermittent drive mechanism.

It is also an object of the invention to provide an improved indexing mechanism for use in intermittently driving the infeed conveyor of a high-speed wrapping machine wherein the operation of the indexing mechanism is smoother and provides a gentle product handling at high speeds.

It is a further object of the invention to provide an intermittent drive or Geneva mechanism so constructed that it can effect a smooth, substantially shock free drive at a higher rate of speed not obtainable with devices heretofore known or used, and in which there is provided a stationary or sun gear and driving planetary gears meshing therewith, which gears in turn drive gears operative to rotate cam followers or driving pins successively engaging angularly spaced slots in a star wheel attached to the driven shaft, such for example as the shaft of the infeed conveyor of a high-speed wrapping machine.

The invention also consists in a planetary Geneva drive mechanism in which the operating parts of the driving unit or Geneva arm are enclosed in a rotating grease-filled, sealed housing, thereby permitting continuous lubrication of these parts, this arrangement also making it possible to remove the driving arm or housing including all the gears contained therein from the driving shaft without loss of mesh or timing.

It is also an object of the invention to provide a novel indexing mechanism or planetary Geneva mechanism in which wear of the lock can be compensated for, and wherein there is provided a device for adjusting the timing during the operation of the Geneva mechanism without necessitating stopping the machine or the removal of the indexing mechanism from the machine of which it forms an operative part.

With these and other objects not specifically mentioned in view, the invention consists in certain combinations and constructions which will be hereinafter fully described and then specifically set forth in the claims hereunto appended.

In the accompanying drawings which form a part of this specification, and in which like characters of reference indicate the same or like parts:

Figure 1 is an end elevation showing a preferred embodiment of the indexing mechanism constituting the invention as seen from line 1—1 of Figure 2;

Figure 2 is a sectional side elevation of the same taken on line 2—2 of Figure 1, and Figure 3 is an end elevation illustrating the indexing mechanism operatively associated with the infeed conveyor of a wrapping machine.

Referring to the drawings, the indexing mechanism or Geneva drive constituting the invention may be of general application for intermittently driving various machine parts. However, as shown in the drawings, it is shown in driving co-operation with the infeed conveyor of a bread wrapping machine.

The indexing mechanism consists of a Geneva star wheel designated generally 10 and a Geneva actuating arm designated generally 12. Arm 12 in the preferred embodiment illustrated herein consists of an oil or grease-filled, sealed, elongated housing, designated generally 15, which is formed by an arm member 14 and a complementary cover member 16. Within housing 15 are located a stationary sun gear 18, a plurality of planetary gears 20, and a plurality of spur gears 22. In the illustrated embodiment, two planetary gears 20 and two spur gears 22 are provided.

Arm member 14 is provided with a suitable elongated hub 24 secured by key 26 to shaft 28. Shaft 28 is the driving shaft and can be driven continuously by means of any suitable device such as a motor (not shown). Sun gear 18 is loosely mounted on the outer periphery of hub 24, and is provided with an elongated hub 30 protruding out of housing 15, as shown in Figure 2. Sun gear 18 is so mounted on hub 24 of arm member 14 that it may be rotated thereon within limits to make desired changes in timing when shaft 28 is stopped or during the operation of the machine with which the invention is used.

The position of sun gear 18 on hub 24 can be changed as desired by means of an adjusting lever 32 having one end clamped to hub 30 of this gear. The free end of lever 32 is provided with a forked portion 34 which supports a pair of set screws 36 mounted in opposition to each other and screwed tight against a stationary rod or stud shaft 38 projecting from a suitable lug 40 on the main frame of the machine (not shown), thus providing means for holding sun gear 18 stationary in its adjusted position at all times.

The two planetary gears 20 are spaced 180° apart and are located adjacent the ends of arm 12. Each gear 20 is loosely mounted on a stud 42 supported in arm member 14 and cover 16. Each gear 20 is also preferably provided with an annular groove 44 (Figure 2) to prevent pumping action of the oil or grease within the housing. As shown in Figure 2, each of the two spur gears 22 is keyed to a shaft 46, the latter having one end projecting outwardly from arm member 14 and carrying on this end a crank disc 48 to which is secured an eccentrically positioned crank pin 50 on which is loosely mounted a driving roller or cam follower 52 adapted to engage with and run in slots or tracks 54 in Geneva star wheel 10.

As shown in Figure 1, star wheel 10 is provided with four equally spaced slots or tracks 54 and locking contours or concave portions 58. If desired, a larger or smaller number of slots and concave portions could be provided. During the continuous rotation of driving shaft 28 and driving arm 12, cam followers or driving rollers 52 alternately engage with the four equally spaced slots or tracks 54 of Geneva star wheel 10 suitably attached to shaft 56. In this manner, the continuous rotary motion of shaft 28 and the alternate engagement of driving rollers 52 with slots 54 in Geneva star wheel 10 effect the desired intermittent motion of shaft 56. Star wheel 10 is provided with the customary locking contours or concave locking portions 58. These are engaged by locking segments 60 formed upon or attached to the outer face of arm member 14 and projecting outwardly therefrom in order to engage with locking portions 58. In this manner, star wheel 10 is prevented from turning when not engaged by one of the driving rollers 52.

In order to insure smooth operation, and eliminate play between locking contours or locking portions 58 of star wheel 10 and locking segments of arm 12 which may occur due to wear, shaft 56, which carries star wheel 10, is so supported that it can be adjusted to or from shaft 28 in order to insure at all times the desired coaction between locking contours or concave portions 58 and locking segments 60. Mechanism adjusting shaft 56 in this manner is shown in Figures 1 and 2 in which eccentric bushing 62 is provided with a flange 64 which, by means of a clamp lug 66 and screw 68, is held in the desired position in frame 70 of the machine. The desired adjusted position of bushing 62 is obtained by unscrewing screw 68 and turning bushing 62. Screw 68 can then be tightened to clamp lug 66 tightly against flange 64, thereby securing bushing 62 in its adjusted position.

Housing 15, which constitutes the Geneva driving or actuating arm 12 is filled with a suitable oil or grease, and between members 14 and 16 there is positioned a suitable gasket 72. Two seal rings 74 and 76 are also provided to insure that oil or grease will not exude from housing 16. This is particularly desirable when the indexing mechanism constituting the invention is used with a wrapping machine or other machine which handles food products, since it prevents any possible contamination of the food product being wrapped or handled.

The several parts which make up housing 15 are held together by suitable means, such as screws 17. By changing the setting of screws 36 with respect to stud 38, lever 32 may be moved to effect a clockwise or counter-clockwise movement of sun gear 18 on hub 24 to which lever 32 is attached. This provides a vernier timing of driving rollers 52 with respect to their engagement with tracks or slots 54 of star wheel 10 and makes it possible to obtain split second timing of the indexing mechanism.

Figure 3 illustrates a typical hook-up of the improved indexing mechanism constituting the invention with an infeed conveyor of a bread wrapping machine. Continuously rotating Geneva actuating arm 12 intermittently drives Geneva star wheel 10 and shaft 56 in the manner stated above. Attached to shaft 56 is a bevel gear 78 which in turn drives a bevel gear 80 mounted on a conveyor shaft 82. Attached to shaft 82 is a pair of driving sprockets 84 which engage with a pair of endless chains 86 to which are secured a plurality of equally spaced lugs 88 which engage a loaf of bread Lendwise and move it intermittently along supporting plates 90 to the wrapping station of the machine (not shown). By means of the intermittent driving mechanism or Geneva drive of the invention, each loaf of bread, whether sliced or unsliced, is handled smoothly. Because of the construction of the Geneva drive, its operation is substantially free of shock and abrupt acceleration and deceleration which might tend to displace or dislodge each loaf of bread being conveyed to the wrapping station. This is because the peak acceleration forces and loads on the cam followers or driving rollers are materially less than those of Geneva or equivalent driving devices heretofore known and used, and accordingly shock and abrupt changes in speed are substantially eliminated.

The invention above described may be varied in construction within the scope of the claims for the particular device, selected to illustrate the invention, is but one of many possible concrete embodiments of the same. The invention is not, therefore, to be restricted to the precise details of the structure shown and described.

What is claimed is:

1. A driving mechanism comprising a rotating shaft, a housing attached to said shaft, a stationary gear in said housing, a driven gear mounted in said housing and engaging said stationary gear, a driven stud shaft projecting through said housing, a gear mounted on said stud shaft within said housing and meshing with said driven gear, a cam follower carried by said stud shaft exteriorly of said housing, a driven shaft, a star wheel attached to said driven shaft, said star wheel being provided with a plurality of slots adapted to be engaged successively by said cam follower, whereby said rotating shaft turns said housing to engage said cam follower with one of said slots for indexing said driven shaft.

2. The mechanism defined in claim 1 including a support in said housing for said stationary gear, and means attached to said gear for turning said gear on said support to adjust the timing of said gear and said driven gears.

3. The invention defined in claim 1 including means for adjusting the position of said stationary gear relative to said driven gears, and means for adjusting the axis of said star wheel to or from the axis of said rotating shaft.

4. In an indexing mechanism, a rotating shaft, an intermittently driven shaft, a rotating driving arm, said arm comprising a grease-filled, sealed housing, means attaching said housing to said rotating shaft, a slotted star wheel fixed to said intermittently driven shaft, a stationary gear mounted in said housing, a gear meshing with said stationary gear and driven therefrom mounted in said housing, a crank shaft, a gear located in said housing and mounted on said crank shaft and driven by said last-named gear, a crank disc located without said housing, and mounted on said crank shaft, an eccentrically mounted cam follower on said disc, a star wheel provided with equidistant elongated slots, means secured to said intermittently driven shaft, said rotating shaft being adapted to drive said arm and move said rotating cam follower with said slots to drive said intermittently driven shaft a fractional part of one revolution.

5. In an indexing mechanism, a rotating shaft, an intermittently driven shaft, a driving arm, comprising a housing member provided with an elongated hub attached to said rotating shaft, a complementary housing member, means securing said members together to form a sealed, grease-filled housing, a sun gear loosely mounted on said hub within said housing, equidistantly spaced planetary gears mounted within said housing and meshing with said sun gear, a gear meshing with and driven by each of said planetary gears, a crank shaft supporting each of said gears, a crank disc secured to each of said crank shafts without said housing, an eccentrically mounted cam follower on each of said discs, a star wheel secured to said intermittently driven shaft, said star wheel having a plurality of equidistantly angularly spaced elongated slots, said planetary gears and said gears secured to said crank shafts being constructed and arranged during the rotation of said driving arm to rotate said discs and said cam followers into and out of engagement with a selected slot in said star wheel and turn said intermittently driven shaft through a fraction of a revolution.

6. The mechanism defined in claim 5 wherein said sun gear is provided with an elongated hub, a lever attached to said hub, means for securing said lever against rotation, and means for adjusting the position of said lever and said sun gear to vary the timing of said driving arm.

7. The invention defined in claim 6 including locks on said driving shaft, and wherein said intermittently driven shaft is provided with an eccentric bushing, and means for rotating said bushing to effect a relative movement between said intermittently driven shaft and said driving shaft to compensate for wear on said locks.

8. The invention defined in claim 5 wherein said housing is mounted for quick detachment from said driving shaft, and means for permitting detachment of said housing from said shaft while maintaining the timing of the gears contained therein free from interruption.

9. In an indexing mechanism, a rotating shaft, an intermittently driven shaft, a star wheel, provided with a plurality of equidistantly arranged elongated slots, mounted on said intermittently driven shaft, a driving arm, a plurality of cam followers mounted on said arm and arranged during the rotation of said rotating shaft to engage in succession said slots in said star wheel to turn said intermittently driven shaft a fraction of a revolution, said driving arm comprising a sealed grease-filled housing, said housing being formed with a member having an elongated hub attached to said rotating shaft, and a complemental member spaced axially from said first-named member, a sun gear loosely mounted on said hub, a device constraining said sun gear against rotation during the rotation of said driving arm, a plurality of equidistant radially spaced planetary gears located within said housing and rotatably supported by said members, a driving gear for each of said cam followers also located within said housing and driven by said planetary gears whereby during the rotation of said rotating shaft said cam followers are rotated to move into said slots and index said star wheel and intermittently driven shaft, and means for adjusting said device to change the angular position of said sun gear relative to said planetary gears to adjust the timing of said mechanism.

10. The mechanism defined in claim 8 including an eccentric mount for said intermittently driven shaft, opposed locking segments of said housing, complemental concave portions formed on said star wheel, and means for adjusting said mount in order to effect a relative movement of said rotating shaft and said intermittently driven shaft to or from each other to compensate for wear between said segments and said concave portions.

11. In an indexing mechanism, a rotating shaft, an intermittently driven shaft, a driving arm mounted on said rotating shaft, a sun gear loosely supported on said arm, equidistantly spaced planetary gears mounted on said arm and meshing with said sun gear, a driven gear meshing with and driven by each of said planetary gears, a crank disc driven by each of said driven gears, an eccentrically mounted driving roller carried by each of said crank discs, a star wheel secured to said intermittently driven shaft, said star wheel having a plurality of slots adapted to be engaged by said driving rollers on said arm, said planetary gears and said driven gears being constructed and arranged during the rotation of said driving arm to rotate said discs and said driving rollers into and out of said slots in said star wheel and turn said intermittently driven shaft through a fraction of a revolution, an adjusting lever attached to said sun gear, means for turning said lever to adjust said sun gear relative to said planetary and driven gears, and means for securing said lever in adjusted position.

R. DOUGLAS RUMSEY.

REFERENCES CITED

The following references are of record in the file of this patent:

UNITED STATES PATENTS

| Number | Name | Date |
|---|---|---|
| 1,174,249 | Gall | Mar. 7, 1916 |
| 1,356,915 | Fisher | Oct. 26, 1920 |
| 1,994,995 | Holmes | Mar. 19, 1935 |

FOREIGN PATENTS

| Number | Country | Date |
|---|---|---|
| 210,274 | Great Britain | Jan. 31, 1924 |